United States Patent [19]

Polvani

[11] Patent Number: 5,357,437
[45] Date of Patent: Oct. 18, 1994

[54] MAGNETIC MARKER POSITION FIXING SYSTEM FOR UNDERWATER VEHICLES

[75] Inventor: Donald G. Polvani, Arnold, Md.

[73] Assignee: Westinghouse Electric Corporation, Pittsburgh, Pa.

[21] Appl. No.: 907,086

[22] Filed: Jul. 1, 1992

[51] Int. Cl.$^5$ .............................................. G06F 15/50
[52] U.S. Cl. .................................. 364/449; 364/457; 364/559
[58] Field of Search ............... 364/559, 571.01, 571.03, 364/448, 449, 457, 460, 424.02, 454; 324/246, 345; 73/178 R; 340/984, 985; 180/167, 168

[56] References Cited

U.S. PATENT DOCUMENTS

| | | | |
|---|---|---|---|
| 4,680,715 | 7/1987 | Pawelek | 364/449 |
| 4,766,385 | 8/1988 | Polvani | 324/345 |
| 4,908,557 | 3/1990 | Sudare et al. | 318/587 |

OTHER PUBLICATIONS

"A Portable Low Noise Frequency Three-Axis Search Coil Magnetometer" by S. A. Macintyre, ENSCO, Inc., pp. 761–763, published in IEEE Transactions of Magnetics, vol. Mag.–16, No. 5, Sep. 1980.

"Magnetometers for Space Research" by Norman F. Ness, CNR Laboratorio del Plasma nello Spanio, Institute di Fisica, Citta Universita-Roma, Mar. 1970.

"Numerical Recipes" by William H. Press, Brian P. Flannery, Saul A. Teukolsky and William T. Vetterling, pp. 246–251, 1989.

"Handbook of Electromagnetic Propagation in Conducting Media" by Headquarters Naval Material Command, pp. 3-1-3-2, 1976.

"Magnetic Guidance of Autonomous Vehicles" by Donald G. Polvani, presented at Oceans '86, IEEE/MTS, Washington, D.C., 1986.

"Magnetic Guidance of Autonomous Vehicles Part 2" by Donald G. Polvani, submitted at Fifth International Symposium on Unmanned Untethered Submersible Technology, University of New Hampshire, 1987.

Primary Examiner—Thomas G. Black
Assistant Examiner—Michael Zanelli

[57] ABSTRACT

A magnetic marker position fixing and resetting system for vehicles searching an area on the floor of a body of water. The vehicle has an inertial navigation system for determining its position and angular orientation with respect to a set of cartesian axes fixed in the earth. The vehicle deploys at least one magnetic marker in the search area. The positions of the markers in the earth-based axes and the magnitude of their magnetic moments are determined and are stored in a computer in the vehicle. The vehicle is equipped with a triaxial vector magnetometer in which the magnetic sensors are mutually orthogonal. When the vehicle's navigation system requires a position reset, the triaxial vector magnetometer on the vehicle detects the marker's magnetic induction components along x, y and z cartesian axes fixed in the vehicle. Algorithms are exercised in the vehicle's computer which use the measured x, y and z components of the marker's magnetic induction to provide a precise estimate of the vehicle's position with respect to the fixed magnetic marker in the vehicle-based axes. This relative position is transformed to components along the earth-based axes. The vehicle's position in the earth-based axes is then computed from the measurement of its position relative to the marker in the earth-based axes and the marker's known position in the earth-based axes. Comparing this derived vehicle position with the vehicle's position as determined by its inertial navigation system provides the required position reset.

22 Claims, 2 Drawing Sheets

MAGNETIC MARKER POSITION FIXING SYSTEM FOR UNDERWATER VEHICLES

BACKGROUND OF THE INVENTION

1. Field of the Invention

This invention relates generally to a position fixing and position reset system for underwater vehicles. More particularly, the invention relates to a position determining system that uses a triaxial vector magnetic sensor to acquire data from a magnet positioned in a search area, and then uses mathematical algorithms to derive from the data a position fix for the vehicle which can be used to reset the vehicle's dead reckoning navigation system.

2. Description of the Prior Art

Some underwater unmanned vehicle missions require the search of an area of water to precisely locate one or more objects. Typically, such vehicles use dead reckoning navigation systems such as an inertial navigation system or a Doppler sonar navigation system. The accuracy of dead reckoning navigation systems deteriorates with time because of unavoidable errors in the outputs of its various components. Eventually, a position reset is required to restore the desired position accuracy. Several methods exist in the art to perform this position reset.

Radionavigation systems could be used to reset the vessel's navigational system. However, since radio waves are rapidly attenuated in sea water, the vehicle must either go to the surface or very near to the surface in order to receive the radio information. Thus, if the vehicle was operating relatively deep, much time and energy would be required for the vessel to travel to the water surface.

Acoustic bottom transponders are another traditional method of providing position fixes to underwater vehicles. However, if transported to the search area by the vehicle and then deployed, transponders significantly reduce the vehicle's available payload. Transponders must also be surveyed once they are deployed to determine their precise bottom location with respect to one another. Typically, the survey process involves repeated and time consuming passes of the vehicle over the area in which the transponders lie in order to gather the necessary acoustic range information. Finally, signals from three transponders are required to determine a unique position fix for the vehicle.

SUMMARY OF THE INVENTION

The present invention provides a magnetic marker position fixing and resetting system for vehicles searching an area on the floor of a body of water. The vehicle has an inertial navigation system for determining its position and angular orientation with respect to a set of x', y' and z' cartesian axes fixed in the earth hereinafter referred to as "earth-based axes" with z' being in the vertical direction. The vehicle deploys at least one magnet (termed a magnetic marker) in the search area. Only one magnet is required for a position fix. However, multiple magnets allow the vehicle to search a larger area. The positions of the markers in the earth-based axes are determined by the system and are stored in an onboard processing unit (hereinafter referred to as the "computer") in the vehicle. The markers are placed in the search area so that their magnetic moment is directed vertically, or along the z' axis of the earth-based axes. The magnitude of each marker's magnetic moment is also stored in the vehicle's computer. The vehicle is equipped with a triaxial vector magnetometer in which the magnetic sensors are mutually orthogonal. When the vehicle's navigation system requires a position reset, the vehicle travels to the vicinity of a marker. The triaxial vector magnetometer on the vehicle detects the marker's magnetic induction components along x, y and z cartesian axes fixed in the vehicle (hereinafter referred to as "vehicle-based axes"). Algorithms are now exercised in the vehicle's computer which use the measured x, y and z components of the marker's magnetic induction to provide a precise estimate of the vehicle's position with respect to the fixed magnetic marker in the vehicle-based axes. This relative position is transformed, in the computer, to components along the earth-based axes using the angular orientation of the vehicle-based axes with respect to the earth-based axes, as supplied by the inertial navigation system, and standard techniques for coordinate transformations. The vehicle's position in the earth-based axes is then computed from the measurement of its position relative to the marker in the earth-based axes and the marker's known position in the earth-based axes. Comparing this derived vehicle position with the vehicle's position as determined by its navigation system provides the required position reset.

In a first preferred embodiment, permanent magnets are used as the magnetic markers. In this embodiment, the vehicle will employ three mutually orthogonal fluxgate magnetometers as the magnetic sensors. In a second preferred embodiment, an alternating current electromagnet is used as the magnetic marker. In this case, the vehicle employs three mutually orthogonal search coils as the magnetic sensors.

DESCRIPTION OF THE PREFERRED EMBODIMENTS

Figure 1:
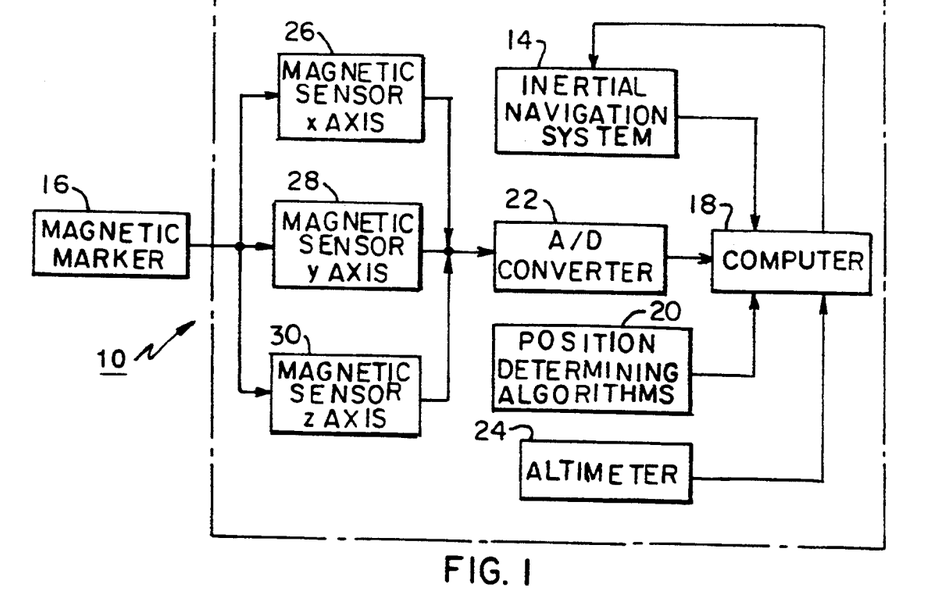
FIG. 1 is a functional block diagram of the present preferred magnetic marker position fixing system.

Referring first to FIG. 1, a functional block diagram is shown for describing the magnetic marker position fixing and resetting system 10 in which a magnetic marker 16 is represented by one functional block and the remaining functional blocks of the system are contained in a vehicle 12 that is preferably constructed of non-magnetic materials. The magnetic marker 16 may either be a permanent magnet or an alternating current electromagnet. The position fixing system hardware on the vehicle 12 will vary depending on which type of magnetic marker 16 is employed. In either embodiment, any number of magnetic markers 16 are placed in the search area. The x', y', z' cartesian axes are fixed in the earth and are referred to as earth-based. They are established and maintained by the inertial navigation system 14. The x, y, z cartesian axes are fixed in the vehicle 12 and are referred to as vehicle-based. The position fixing system 10 determines and stores in the vehicle's computer 18 the position in the earth-based axes of each marker 16 when they are first deployed. The determination and storage of the marker's position is done in the following manner. The vehicle 12 assumes a level flight path prior to marker deployment so that its velocity vector lies in the earth-based x', y' plane. The marker 16 is released so as to fall with its magnetic moment along the vertical direction. The earth-based coordinates of the marker (x'$_R$, y'$_R$, z'$_R$) at the instant of its release are recorded by the computer 18. These coordinates are given by the position of the vehicle 12 in earth-based axes (x', y', z') from the inertial navigation system 14 at the time of release plus corrections (a', b', c') along earth-based axes for the offsets of the marker 16. These offsets of the markers 16 are present due to the marker 16 being mounted in the vehicle at some point other than at the center of the vehicle 12. The corrections (a', b', c') are arrived at in the computer 18 by transforming the offsets (a, b, c) of the marker 16 from the vehicle's center along the vehicle-based axes to earth-based axes using the angular orientation of the vehicle-based axes with respect to the earth-based axes. The angular orientation of the vehicle-based axes with respect to the earth-based axes is supplied by the inertial navigation system 14. The earth-based coordinates of the marker 16 at its release are then given by:

$$x'_R = x' + a'$$

$$y'_R = y' + b'$$

$$z'_R = z' + c'$$

After its release, the marker 16 falls to the floor of the search area subject to the force of gravity and hydrodynamic drag forces. Using well known techniques of classical mechanics and hydrodynamics, the marker's impact position on the floor of the search area can be predicted. Preferably, the markers 16 would be released at vehicle speeds less than 2.5 meters/sec and altitudes less than 3 meters in order to minimize both motion of the marker 16 after impacting the floor of the search area and possible burial of the marker 16 in the search area floor. Standard design techniques for the marker's external shape (e.g. the addition of fins and a nose cone) would assist in accurately predicting its impact point on the search area floor at higher speeds and altitudes. To illustrate, in a simple fashion, the procedure for calculating the earth-based position of the marker on the floor, consider a case where hydrodynamic forces can be neglected relative to gravity. This is approximately true at very slow speeds (less than 1.3 meters/sec) and very low altitudes (less than 1.5 meters) for cylindrical markers, falling with their axis vertical, which are 25 centimeters long, 5 centimeters in diameter and weigh approximately 4 kilograms. The earth-based coordinates of the marker 16 on the bottom are then given by:

$$x'_M = x'_R + v_x \cdot t_M$$

$$y'_M = y'_R + v_y \cdot t_M$$

$$z'_M = z'_R - (A + c')$$

where $v_x$, $v_y$, are the components of the vehicle's velocity along the earth-based x', y' axes, respectively, A is the altitude of the vehicle 12 from the floor of the search area (as provided by the altimeter 24), and $t_M$ is the time for the marker 16 to reach the floor of the search area after release. The computer 18 computes $t_M$ from:

$$t_M = \sqrt{\frac{2(A + c')}{g}}$$

where g is the acceleration due to gravity. The signs in the equation for $z'_M$ assume that the earth-based z' axis points upward. A is a positive quantity, and c' is positive for markers released above the vehicle's center and negative for markers released below the vehicle's center. The magnitude of the magnetic moment of each marker 16 has been measured by standard techniques after its manufacture. The vehicle 12 stores the magnitude of the magnetic moment of each marker 16 in the computer 18.

The accuracy of dead reckoning navigation systems (like an inertial navigation system) decreases with time. As this occurs, errors develop in the navigation system 14 as to the position of the vehicle 12. If left unchecked, the errors will eventually grow to a size which prevents the vehicle from accomplishing its search mission.

When the vehicle's navigation system 14 requires a position reset because of increased error in the navigation system, the vehicle 12 travels to the vicinity of one of the markers 16. The vehicle 12 is equipped with a computer 18 for the receiving and storage of data and the performance of algorithms 20. Magnetic sensors 26, 28, 30 on the vehicle 12 detect the marker 16 and measure the components of the marker's magnetic induction along the vehicle-based axes. The individual axes of the triaxial vector magnetometers are aligned along the vehicle-based axes. To reduce the influence of magnetic noise originating in the vehicle 12, the magnetometers are mounted at the ends of booms extending beyond the hull of the vehicle. The length of the booms could be calculated from the size of the expected marker signal and the expected vehicle magnetic noise. Reduced system range and accuracy would be achieved with the magnetometers located inside the vehicle 12. As the vehicle moves, the vehicle-based based axes move with respect to the earth-based axes. The inertial navigation system 14 keeps track of the angular orientation between the vehicle-based and earth-based axes.

Computer algorithms 20 are provided in the computer 18 which give precise estimates of the vehicle's position with respect to the fixed marker 16 in vehicle-based coordinates. This relative position is transformed in the computer 18, using standard techniques for coordinate transformations, to components along the earth-based axes. The earth-based components are derived using the angular orientation of the vehicle-based axes with respect to the earth-based axes, as supplied by the inertial navigation system 14. The vehicle's position in the earth-based axes is then computed from the measurement of its position relative to the marker 16 in the earth-based axes and the marker's position in the earth-based axes. Comparing this marker derived vehicle position with the vehicle's position as determined by its navigation system 14, provides the required position reset in earth-based axes.

Figure 2:
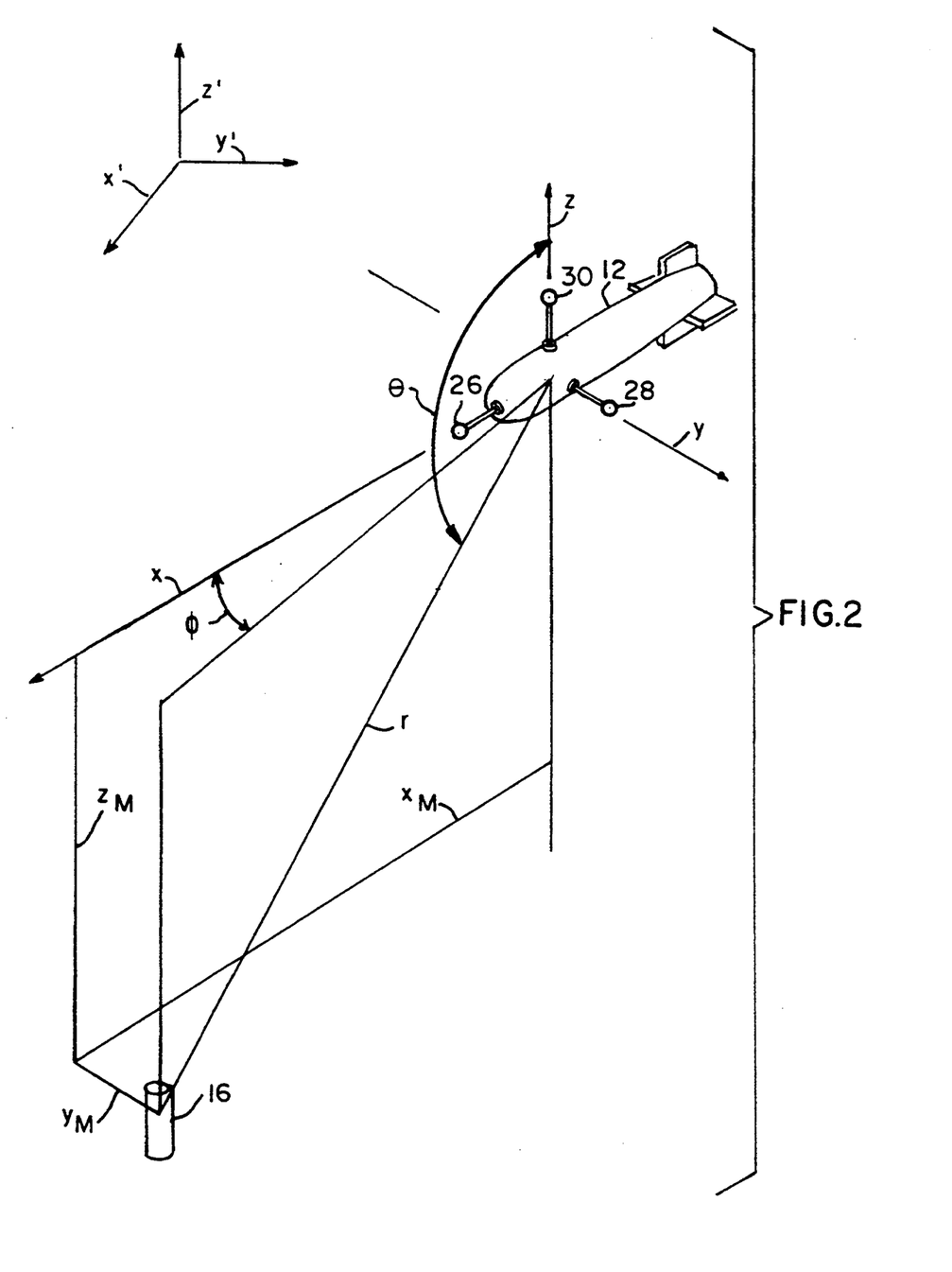
FIG. 2 shows the cartesian and spherical coordinate systems in which the vehicle and marker operate.

Referring next to FIGS. 1 and 2, a first preferred embodiment employs permanent magnets as the magnetic markers 16. The preferred permanent magnets are of either the rectangular or round bar type and are commercially available. In this embodiment, the magnetic sensors 26, 28, 30 are three standard, commercially available, mutually orthogonal, fluxgate magnetometers aligned along the x, y and z vehicle-based axes, respectively. The range at which the system 10 can detect the magnetic marker 16 can be increased by either increasing the size of the permanent magnet or increasing the sensitivity of the fluxgate magnetometers. The vehicle 12 is provided with an inertial navigation system 14 which references the vehicle's position relative to the earth-based cartesian axes x', y' and z'. The vehicle's navigation system 14 generates a digital signal representing the vehicle's position. The vehicle's position as measured by the vehicle's navigation system 14 is given by $x'_o$, $y'_o$, $z'_o$. This navigational position signal is inputted to the computer 18.

The vehicle 12 is also provided with an altimeter 24 for determining the vehicle's altitude in the search area. Commercially available sonar altimeters would be suitable for this purpose. The altimeter output is a digital signal representing the vehicle's altitude. This altitude signal is inputted to the computer 18 and is used, as already described, in the calculation of the marker's earth-based z' coordinate. When in the vicinity of a magnetic marker 16, each magnetometer detects the component of the magnetic induction parallel to its sensitive axis and provides an analog signal output proportional to that component. The analog signal outputs from these magnetometers yield the x, y and z components of the marker's magnetic induction along the vehicle-based cartesian axes. The components of the magnetic induction along the x, y, z vehicle-based axes are designated as $B_x$, $B_y$ and $B_z$, respectively. The magnetic sensors 26, 28, 30 do not distinguish between signals from the different permanent magnets. Thus, the marker position predicted by the vehicle's navigation system 14 is used to distinguish between markers 16. Therefore, a position reset should be performed before the position error in the navigation system 14 grows to a value equal to the separation distance between markers 16.

The vehicle 12 is also provided with an analog to digital converter 22 which converts the analog signals of $B_x$, $B_y$ and $B_z$ generated by the magnetometers into digital signals suitable for input into the vehicle's computer 18. Position determining algorithms 20 are then used by the computer 18 to determine the vehicle's location with respect to the marker 16. This procedure starts by using magnetic induction $B_x$, $B_y$ and $B_z$ to determine the cartesian coordinate components of the detected vehicle's location with respect to the marker 16 in spherical coordinates (r, $\theta$, $\Phi$) where r is the radial distance between the vehicle 12 and the marker 16, $\theta$ is the polar angle formed between r and the vehicle-based z axis, and $\phi$ is the azimuthal angle formed between the projection of r in the vehicle-based x, y plane and the vehicle-based x axis. Standard mathematical manipulation of the equations (which are preferably performed in SI units) describing the measured magnetic induction components yields the following results. The radial distance, r, is found from the following equation:

$$r = \left[ \frac{\frac{\mu_o M}{\pi}}{-B_z + \sqrt{B_z^2 + 8B^2}} \right]^{\frac{1}{3}}$$

where $\mu_0$ is the constant value of the magnetic permeability of free space ($4\pi \times 10^{-7}$ weber/meter-ampere) M is the magnitude of the magnetic moment of the marker 16, and $B^2$ is the square of the magnitude of the magnetic induction as determined by $B^2 = B_x^2 + B_y^2 + B_z^2$.

The constant value of $\mu_0$ as well as the value of M are stored in the vehicle's computer 18.

The polar angle $\theta$ is then found using the equation:

$$\theta = \frac{1}{2} \cos^{-1}\left( \frac{8\pi r^3 B_z - \mu_o M}{3\mu_o M} \right)$$

The azimuthal angle $\Phi$ is then obtained from the equation:

$$\phi = \tan^{-1}\left( \frac{B_y}{B_x} \right)$$

From the values for the spherical coordinates r, $\theta$, and $\Phi$, the marker's position with respect to the vehicle 12 can be found along the vehicle-based cartesian axes x, y and z. These position values are $x_{MV}$, $y_{MV}$, $z_{MV}$, respectively. The position coordinate of the marker 16 relative to the vehicle-based axes along the vehicle-based x axis is obtained from the following equation:

$$x_{MV} = r \sin(\theta) \cos(\Phi)$$

The coordinate of the marker relative to the vehicle-based axes along the vehicle-based y axis is found through the following equation:

$$y_{MV} = r \sin(\theta) \sin(\Phi)$$

The coordinate of the marker relative to the vehicle-based axes along the vehicle-based z axis is then found by using the following equation:

$$z_{MV} = r \cos(\theta)$$

Thus, the relative position between the vehicle 12 and the marker 16 is found in the vehicle-based cartesian coordinates as $x_{MV}$, $y_{MV}$ and $z_{MV}$. This vehicle-based relative position is transformed in the computer 18 using standard techniques for coordinate transformations, to components along the earth-based axes. These components are derived using the angular orientation of the vehicle-based axes with respect to the earth-based axes, as supplied by the inertial navigation system 14. The earth-based components of the position of the marker 16 relative to the vehicle 12 are given by $x'_{MV}$, $y'_{MV}$, $z'_{MV}$. Thus, the earth-based components of the position of the vehicle relative to the marker are given by:

$$x'_{VM} = -x'_{MV}$$

$$y'_{VM} = -y'_{MV}$$

$$z'_{VM} = -z'_{MV}$$

The marker's coordinates were determined and recorded in the computer 18 after deployment of the marker 16 in the manner previously described. With respect to the earth-based axes, the marker 16 is positioned at $x'_M$, $y'_M$, $z'_M$. Thus, the vehicle's new position (x″, y″, z″), as determined by this system 10, is given in the earth-based cartesian coordinates by the sum of the marker's position and the vehicle's position relative to the marker:

$$x'' = x'_M + x'_{VM}$$

$$y'' = y'_M + y'_{VM}$$

$$z'' = z'_M + z'_{VM}$$

The navigation system 14 measures the vehicle's present position as $x'_o$, $y'_o$, $z'_o$. However, the present position fixing system 10 has determined the vehicle 12 to be at the position $x''$, $y''$, $z''$. Therefore, the reset to be added to the earth-based coordinates of the onboard navigation system 14 is:

$$x_{rest} = x'' - x'_o$$

$$y_{rest} = y'' - y'_o$$

$$z_{rest} = z'' - z'_o$$

In this manner, the resets in the earth-based x', y', and z' directions are to be added to all future navigation system outputs until the next position fix using a magnetic marker 16 occurs. At that time, the navigation system's measurements of the vehicle's new position components ($x_1'$, $Y_1'$, $z_1'$), which are devoid of any position-fixing system resets, are subtracted from the new position fix of this system 10 ($x_1''$, $Y_1''$, $z_1''$), in the manner already explained, to determine new reset values which replace the previous values. This replacement of reset values occurs every time a new position fix using a magnetic marker occurs.

in the second preferred embodiment, an alternating current electromagnet is used as the magnetic marker 16. The electromagnets consist of many (e.g. 10,000) turns of thin (e.g. number 40 AWG) wire wound on a supportive cylindrical core. Provision of a high permeability magnetic core would increase the resulting magnetic moment of the electromagnet and, thereby, increase the detection range. A battery powered electrical oscillator circuit, contained within the electromagnet assembly, provides electrical current of the desired magnitude (e.g. 10 milliamperes) and frequency (e.g. 10 to 500 hertz). In this case, the magnetic sensors 26, 28, 30 of FIG. 1 are preferred to be three mutually orthogonal search coils aligned along the x, y, z vehicle-based axes, respectively. The performance and construction of suitable search coils is well known and described in the technical literature (see, for example, S. A. Macintyre, "A Portable Low Noise Low Frequency Three-Axis Search Coil Magnetometer", IEEE Transactions on Magnetics, Vol. MAG-16, No. 5, September 1980, pp. 761–763). The coils may contain a high permeability magnetic core to increase their sensitivity. The range at which the system 10 can detect the magnetic marker can be increased by either increasing the magnetic moment of the electromagnet (e.g. by increasing the electrical current, the number of turns of wire, or the cross-sectional area of the core) or by increasing the sensitivity of the search coils. The vehicle 12 is equipped with an inertial navigational system 14 which has its own set of earth-based cartesian reference axes x', y', z'. The navigation system 14 generates a digital signal representing the vehicle's position with respect to these axes. The vehicle's position as measured by the vehicle's navigational system is given by $x'_o$, $y'_o$, $z'_o$. The navigational position signal is then inputted to the computer 18. The vehicle 12 is also equipped with an altimeter 24 for determining the vehicle's altitude in the search area. Commercially available sonar altimeters would be suitable for this purpose. The output of the altimeter 24 is a digital signal representing the vehicle's altitude. This altitude signal is inputted to the computer 18 and is used, as already described, in the calculation of the marker's earth-based z' coordinate. Analog signals generated by the magnetic sensors 26, 28, 30 are produced which represent the x, y and z components of the magnetic induction of the marker 16 along the vehicle-based axes. Thus, magnetic induction components $B_x$, $B_y$, $B_z$ are found for the vehicle-based x, y and z axes, respectively.

The vehicle 12 is equipped with an analog to digital converter 22. The analog signals of the magnetic induction components $B_x$, $B_y$ and $B_z$ are sent to the analog to digital converter 22 which converts the analog signals to digital signals suitable for input to the vehicle's computer 18. The computer 18 has stored values for the magnetic moment (M) of the marker 16 and the magnetic permeability of free space ($\mu_0$). Also, since an alternating current electromagnet marker 16 is now used, the value for the electrical conductivity of the sea water ($\sigma$) in the search area as well as the value of the marker's frequency of operation (f) are stored in the computer 18. The electrical conductivity of sea water is available directly from oceanographic measurements in many ocean areas or it can be computed from widely available salinity measurements. The preferred range of operating frequencies for the electromagnet occur in the range of 10 to 500 hertz. This range of frequencies represents a balance between search coil sensitivity and attenuation of the magnetic signal in the sea water since both the search coil sensitivity and the attenuation of the magnetic signal increase with increased frequency. In the case in which more than one marker 16 is used, the electromagnets can be set for different operating frequencies. Thus, the vehicle 18 can distinguish between markers by recognizing each marker's operating frequency. This can be done by equipping the magnetic sensors with standard frequency measuring circuitry such as a set of narrow band frequency filters tuned to different frequencies. The filter with the highest output determines the marker's frequency.

The computer 18 then employs algorithms 20 using the magnetic induction values $B_x$, $B_y$ and $B_z$ obtained by the magnetic sensors to determine the vehicle's position with respect to the marker 16. The SI system of units is used. The relative position between the marker and the vehicle is first determined in spherical coordinates r, $\theta$ and $\Phi$ and then transformed to the vehicle-based cartesian coordinates x, y and z. Because of the complicated spatial dependence of the magnetic induction in the case of the alternating current electromagnet, it is difficult to solve an exact set of equations for all the relative spherical coordinates, therefore, the radial coordinate is preferably determined numerically from the root of a nonlinear function G(r). Once the radial coordinate has been determined, exact equations may be used to determine the remaining two spherical coordinates, the polar coordinate $\theta$ and the azimuthal coordinate $\Phi$. Function G(r) is determined in the following steps. The wave number $\beta$ is first determined. The wave number $\beta$ is found by the following standard equation for the wave number of an electromagnetic wave in a conductor:

$$\beta = \frac{2\pi}{\lambda} = \sqrt{\pi f \mu_0 \sigma}$$

where λ is the wavelength of the electromagnetic wave.

The square of the magnetic induction magnitude $B^2$ is then found by the following equation:

$$B^2 = B_x^2 + B_y^2 + B_z^2 \qquad 5$$

The radial functions $b_r(r)$ and $b_\theta(r)$ are then determined. The radial functions $b_r(r)$ and $b_\theta(r)$ were derived as intermediate steps in the formulation of the function $G(r)$ whose root yields a solution for r. The radial function $b_r(r)$ is found by the following equation:

$$b_r(r) = \frac{\mu_o M}{2\pi r^3} e^{-\beta r} [(1 + \beta r) \cos(\beta r) + \beta r \sin(\beta r)]$$

The radial function $b_\theta(r)$ is found by the following equation:

$$b_\theta(r) = \frac{\mu_o M}{4\pi r^3} e^{-\beta r} [(1 + \beta r) \cos(\beta r) + (\beta r + 2\beta^2 r^2) \sin(\beta r)]$$

These functions can be derived directly from standard expressions for electromagnetic fields in a conductor.

From these values, the nonlinear function $G(r)$ is found whose root provides the solution for the relative radial distance r between the vehicle 12 and the marker 16. After standard algebraic manipulations, $G(r)$ is provided by the following equation:

$$G(r) = \left(1 - \frac{B_z b_r(r)}{B^2}\right)\left(1 + \frac{B_z b_\theta(r)}{B^2}\right) - \frac{b_r(r) b_\theta(r)}{B^2}\left(1 - \frac{B_z^2}{B^2}\right)$$

Figure 3:
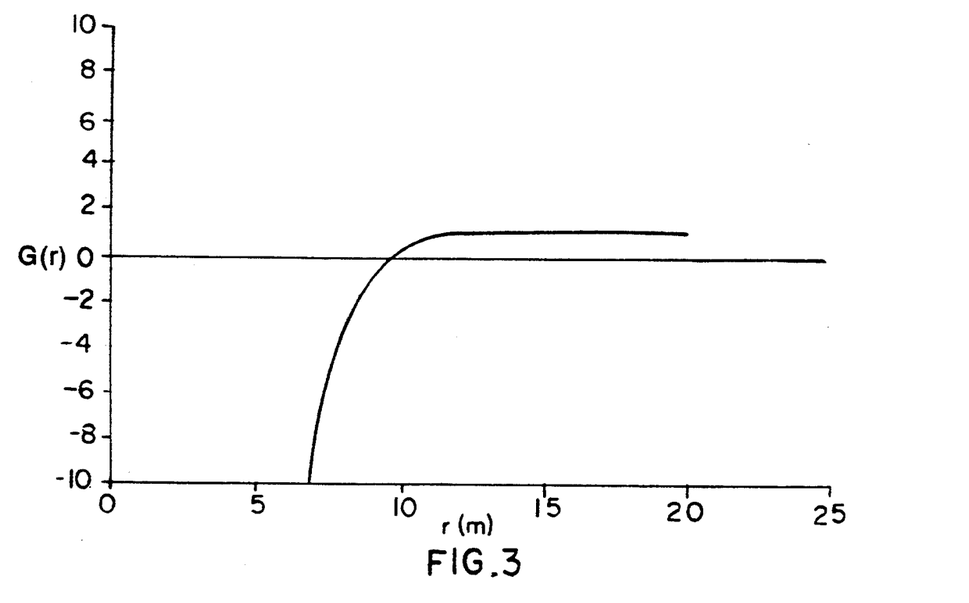
FIG. 3 is a plot of the nonlinear function G(r) versus r for a set of arbitrarily selected parameters.

The value of r is then computed by finding the root of the function $G(r)$. The root of this function may be found through the use of a standard numerical root finding method such as the Secant method. Experience has shown that $G(r)$ possesses only one root so that multiple roots are not a problem. FIG. 3 displays a typical plot of $G(r)$ versus r indicating the presence of only one root near r=10 meters. In FIG. 3, the following example parameters were used:

$\sigma = 4$ mho/meter $M = 2$ amp-meter$^2$ $f = 10$ hertz

Once the root of function $G(r)$ has been found, providing the solution for r, the radial functions $b_r(r)$ and $b_\theta(r)$ are computed. The polar angle $\theta$ between the vehicle 12 and the marker 16 is then computed from the following equation:

$$\theta = \tfrac{1}{2} \cos^{-1}\left[\frac{b_\theta(r) - b_r(r) + 2B_z}{b_r(r) + b_\theta(r)}\right]$$

The azimuthal angle $\Phi$ between the vehicle 12 and the marker 16 is then computed from the following equation:

$$\phi = \tan^{-1}\left(\frac{B_y}{B_x}\right)$$

From the values for the spherical coordinates r, $\theta$, and $\Phi$, the marker's position with respect to the vehicle 12 can be found along the vehicle-based cartesian coordinate axes x, y and z. These position values are denoted as $x_{MV}$, $y_{MV}$ and $z_{MV}$, respectively. The position coordinate of the marker 16 relative to the vehicle 12 along the vehicle-based x axis is obtained from the following equation:

$$x_{MV} = r \sin(\theta) \cos(\Phi)$$

The position coordinate of the marker 16 relative to the vehicle 12 along the vehicle-based y axis is found through the following equation:

$$y_{MV} = r \sin(\theta) \sin(\Phi)$$

The position coordinate of the marker 16 relative to the vehicle 12 along the vehicle-based z axis is then found by using the following equation:

$$z_{MV} = r \cos(\theta)$$

Thus, the relative position between the vehicle 12 and the marker 16 is found in cartesian coordinates as $x_{MV}$, $y_{MV}$ and $z_{MV}$. This vehicle-based relative position is transformed, in the computer, to earth-based components. These components are derived using the angular orientation of the vehicle-based axes with respect to the earth-based axes, as supplied by the inertial navigation system, and by employing standard techniques for coordinate transformations. The earth-based components of the position of the marker 16 relative to the vehicle 12 are given by $x'_{MV}$, $y'_{MV}$, $z'_{MV}$. Thus, the earth-based components of the position of the vehicle 12 relative to the marker 16 are given by:

$$x'_{VM} = -x'_{MV}$$

$$y'_{VM} = -y'_{MV}$$

$$z'_{VM} = -z'_{MV}$$

The marker's coordinates were determined and recorded in the computer 18 after deployment of the marker 16 in the manner previously described. With respect to the earth-based axes, the marker is positioned at $x'_M$, $y'_M$, $z'_M$. Thus, the vehicle's new position (x″, y″, z″), as determined by this system 10, is given in the earth-based cartesian coordinates by the sum of the marker's position and the vehicle's position relative to the marker.

$$x'' = x'_M + x'_{VM}$$

$$y'' = y'_M + y'_{VM}$$

$$z'' = z'_M + z'_{VM}$$

The navigation system 14 measures the vehicle's present position as $x'_o$, $y'_o$, $z'_o$. However, the present position fixing system 10 has determined the vehicle to be at the position x″, y″, z″. Therefore, the reset to be added to the earth-based coordinates of the onboard navigation system 14 is:

$$x_{rest} = x'' - x'_o$$

$$y_{rest} = y'' - y'_o$$

$$z_{rest} = z'' - z'_o$$

In this manner, the resets in the earth-based x', y' and z' directions are to be added to all future navigation system outputs until the next position fix using a magnetic marker 16 occurs. At that time, the navigation system's measurements of the vehicle's new position components ($x_1'$, $y_1'$, $z_1'$), which are devoid of any position-fixing system resets, are subtracted from the new position fix of this system 10 ($x_1''$, $y_1''$, $z_1''$), in the manner already explained, to determine new reset values which replace the previous values. This replacement of reset values occurs every time a new position fix using a magnetic marker 16 occurs.

While certain present preferred embodiments have been shown and described, it is distinctly understood that the invention is not limited thereto but may be otherwise embodied within the scope of the following claims.

I claim:

1. A method of resetting a current position value of a vehicle navigation system in a three-dimensional search area comprising the steps of:
    (a) placing at least one magnetic marker external to the vehicle and in a selected initial location in the search area, the marker generating a magnetic induction that is detectable up to a selected range;
    (b) detecting at the vehicle, signals that represent the magnitude of the marker's magnetic induction in components of a cartesian coordinate system;
    (c) converting the magnetic induction signals to position coordinates; and
    (d) changing said current position value to reset it to an updated value as a function of said position coordinates.

2. The method of claim 1 wherein the magnetic markers are permanent markers.

3. The method of claim 2 wherein the magnetic induction signals are detected by three mutually orthogonal, fluxgate magnetometers.

4. The method of claim 3 wherein the magnetic induction signals are detected by three mutually orthogonal search coils.

5. The method of claim 1 wherein the magnetic markers are alternating current electromagnets.

6. The method of claim 1 wherein the conversion of the magnetic induction signals to position coordinates is performed by a processing unit.

7. A system for the position resetting of a vehicle in a three-dimensional search area, the system comprising:
    (a) at least one magnetic marker placed external to the vehicle and in a selected initial location in the search area along a floor of the search area, the marker generating a magnetic induction that is detectable up to a selected range;
    (b) magnetic sensors which produce analog signals in response to the magnetic induction of the marker, the signals corresponding to a position relative to the marker in components of a cartesian coordinate system, the sensors having a selected detection range;
    (c) an analog to digital converter, connected to the sensors, for converting the analog sensor signals to digital signals;
    (d) a vehicle navigation system for determining the position of the vehicle in the search area relative to a set of earth-based cartesian axes, and generating a digital signal which represents the vehicle's navigational position, the navigation system developing error over time;
    (e) an altimeter for determining an altitude above the search area floor for the vehicle, and generating a digital signal which represents the vehicle's altitude; and
    (f) a processing unit located on the vehicle, the processing unit being operable to receive the digital sensor signals, the digital altitude signals and the digital navigational position signals, and being operable to store the initial location of the magnetic marker as coordinates of an earth-based cartesian coordinate system, the processing unit having memory containing at least one program:
        (i) for computing a distance between the vehicle and the marker by converting the magnetic induction digital signals into values for r, $\theta$ and $\Phi$ in a vehicle-based spherical coordinate system, where r is a radial distance between the vehicle and the marker, $\theta$ is a polar angle between the vehicle and the marker and $\Phi$ is an azimuthal angle between the vehicle and the marker;
        (ii) for converting the distance between the vehicle and the marker from spherical coordinates to vehicle-based cartesian coordinates;
        (iii) for converting the distance between the vehicle and the marker in vehicle-based cartesian coordinates to earth-based cartesian coordinates using an angular orientation between the vehicle and earth-based coordinate axes as provided by an inertial navigation system;
        (iv) for determining the vehicle's position in earth-based axes by summing the cartesian components of the marker's stored initial location in earth-based axes with the cartesian coordinate values for the distance between the vehicle and the marker in earth-based axes; and
        (v) for comparing and adjusting the vehicle position as determined by the vehicle navigation system to the vehicle position as determined by the position fixing system.

8. The system of claim 7 wherein the magnetic markers are permanent magnets.

9. The system of claim 8 wherein the magnetic sensors are three mutually orthogonal fluxgate magnetometers.

10. The system of claim 9 wherein the means for converting the magnetic induction signals into values for r, $\theta$ and $\Phi$ is given by:

$$r = \left[ \frac{\frac{\mu_o M}{\pi}}{-B_z + \sqrt{B_z^2 + 8B^2}} \right]^{\frac{1}{3}}$$

and $$\theta = \frac{1}{2} \cos^{-1}\left( \frac{8\pi r^3 B_z - \mu_o M}{3\mu_o M} \right)$$

-continued and $$\phi = \tan^{-1}\left(\frac{B_y}{B_x}\right)$$

and where:
x=an axis in a vehicle-based cartesian coordinate system;
y=an axis in a vehicle-based cartesian coordinate system and being orthogonal to x;
z=an axis in a vehicle-based cartesian coordinate system and being orthogonal to x and y;
$B_x$=component of the marker magnetic induction in the x direction of the vehicle-based cartesian coordinate system;
$B_y$=component of the marker magnetic induction in the y direction of the vehicle-based cartesian coordinate system;
$B_z$=component of the marker magnetic induction in the z direction of the vehicle-based cartesian coordinate system;
$\mu_0$=magnetic permeability of free space constant=$4\pi \times 10^{-7}$ weber/meter-ampere;
M=magnetic moment of the marker; and
$B^2 = B_x^2 + B_y^2 + B_z^2$.

11. The system of claim 10 wherein the means for converting the distance between the vehicle and the marker from vehicle-based spherical coordinates to vehicle-based cartesian coordinates is given by:

$$x_{MV} = r \sin(\theta) \cos(\Phi);$$

and $$y_{MV} = r \sin\theta \sin(\Phi);$$

and $$z_{MV} = r \cos(\theta)$$

and where:
$x_{MV}$=the distance between the marker and the vehicle in the x direction of the vehicle-based axes;
$y_{MV}$=the distance between the marker and the vehicle in the y direction of the vehicle-based axes; and
$z_{MV}$=the distance between the marker and the vehicle in the z direction of the vehicle-based axes.

12. The system of claim 11 wherein the means for determining the vehicle's position in an earth-based cartesian coordinate system is given by:

$$x'' = x'_M + x'_{VM}$$

$$y'' = y'_M + y'_{VM}$$

$$z'' = z'_M + z'_{VM}$$

wherein:
x'=an axis in an earth-based cartesian coordinate system;
y'=an axis in an earth-based cartesian coordinate system and being orthogonal to x';
z'=an axis in an earth-based cartesian coordinate system and being orthogonal to x' and y';
$x'_{MV}$=a distance between the vehicle and the marker in the x' direction of the earth-based axis, said distance being derived from $x_{MV}$;
$y'_{VM}$=a distance between the vehicle and the marker in the y' direction of the earth-based axis, said distance being derived from $Y_{MV}$;
$z'_{VM}$=a distance between the vehicle and the marker in the z' direction of the earth-based axis, said distance being derived from $z_{MV}$;
x''=the vehicle's position on the x' axis as determined by the position fixing system;
y''=the vehicle's position on the y' axis as determined by the position fixing system;
z''=the vehicle's position on the z' axis as determined by the position fixing system;
$x'_M$=the marker's location along the x' axis;
$y'_M$=the marker's location along the y' axis; and
$z'_M$=the marker's location along the z' axis.

13. The system of claim 12 wherein the means for comparing and adjusting the vehicle position as determined by the vehicle navigation system to the vehicle position as determined by the position fixing system is given by:

$$x_{reset} = x'' - x'_o$$

$$y_{reset} = y'' - y'_o$$

$$z_{reset} = z'' - z'_o$$

wherein:
$x_{reset}$=an adjustment to be added to the x' output of the vehicle navigation system;
$Y_{reset}$=an adjustment to be added to the y' output of the vehicle navigation system;
$z_{reset}$=an adjustment to be added to the z' output of the vehicle navigation system;
$x'_o$=the vehicle's position along the x' axis as determined by the vehicle navigation system;
$y'_o$=the vehicle's position along the y' axis as determined by the vehicle navigation system; and
$z'_o$=the vehicle's position along the z' axis as determined by the vehicle navigation system.

14. The system of claim 7 wherein the magnetic markers are alternating current electromagnets.

15. The system of claim 14 wherein the magnetic sensors are three mutually orthogonal search coils.

16. The system of claim 17 wherein the magnetic induction signals are converted into values for r, $\theta$ and $\Phi$ wherein r is found by solving for the root of the function:

$$G(r) = \left(1 - \frac{B_z b_r(r)}{B^2}\right)\left(1 + \frac{B_z b_\theta(r)}{B^2}\right) - \frac{b_r(r) b_\theta(r)}{B^2}\left(1 - \frac{B_z^2}{B^2}\right)$$

wherein:
$\mu_0$=magnetic permeability of free space constant;
$\sigma$=the electrical conductivity of sea water;
f=marker's frequency of operation;
$\lambda$=wavelength of the electromagnetic wave in the sea water of electrical conductivity $\sigma$.

$$\beta = \frac{2\pi}{\lambda} = \sqrt{\pi f \mu_0 \sigma}$$

-continued $$b_r(r) = \frac{\mu_o M}{2\pi r^3} e^{-\beta r} [(1 + \beta r) \cos(\beta r) + \beta r \sin(\beta r)]$$

$$b_\theta(r) = \frac{\mu_o M}{4\pi r^3} e^{-\beta r} [(1 + \beta r) \cos(\beta r) + (\beta r + 2\beta^2 r^2) \sin(\beta r)]$$

$B_x$=component of the marker magnetic induction in the x direction of a vehicle-based cartesian coordinate system;

$B_y$=component of the marker magnetic induction in the y direction of a vehicle-based cartesian coordinate system;

$B_z$=component of the marker magnetic induction in the z direction of a vehicle-based cartesian coordinate system;

$B^2 = B_x^2 + B_y^2 + B_z^2$ wherein $\theta$ is found by:

$$\theta = \frac{1}{2} \cos^{-1} \left[ \frac{b_\theta(r) - b_r(r) + 2B_z}{b_r(r) + b_\theta(r)} \right]$$

and wherein $\Phi$ is found by:

$$\phi = \tan^{-1} \left( \frac{B_y}{B_x} \right).$$

17. The system of claim 16 wherein the means for converting the distance between the vehicle and the marker from vehicle-based spherical coordinates to vehicle-based cartesian coordinates is given by:

$x_{MV} = r \sin(\theta) \cos(\Phi);$ and $y_{MV} = r \sin\theta \sin(\Phi);$ and $z_{MV} = r \cos(\theta)$ and where:
 $x_{MV}$=the distance between the marker and the vehicle in the x direction of the vehicle-based axes;
 $y_{MV}$=the distance between the marker and the vehicle in the y direction of the vehicle-based axes; and
 $z_{MV}$=the distance between the marker and the vehicle in the z direction of the vehicle-based axes.

18. The system of claim 17 wherein the means for determining the vehicle's position in an earth-based cartesian coordinate system is given by:

$x'' = x'_M + x'_{VM}$ $y'' = y'_M + y'_{VM}$ $z'' = z'_M + z'_{VM}$ wherein:
 $x'$=an axis in an earth-based cartesian coordinate system;
 $y'$=an axis in an earth-based cartesian coordinate system and being orthogonal to $x'$;
 $z'$=an axis in an earth-based cartesian coordinate system and being orthogonal to $x'$ and $y'$;
 $x'_{VM}$=a distance between the vehicle and the marker in the $x'$ direction of the earth-based axis, said distance being derived from $x_{MV}$;
 $y'_{VM}$=a distance between the vehicle and the marker in the $y'$ direction of the earth-based axis, said distance being derived from $y_{MV}$;
 $z'_{VM}$=a distance between the vehicle and the marker in the $z'$ direction of the earth-based axis, said distance being derived from $z_{MV}$;
 $x''$=the vehicle's position on the $x'$ axis as determined by the position fixing system;
 $y''$=the vehicle's position on the $y'$ axis as determined by the position fixing system;
 $z''$=the vehicle's position on the $z'$ axis as determined by the position fixing system;
 $x'_M$=the marker's location along the $x'$ axis;
 $y'_M$=the marker's location along the $y'$ axis; and
 $z'_M$=the marker's location along the $z'$ axis.

19. The system of claim 18 wherein the means for comparing and adjusting the vehicle position as determined by the vehicle navigation system to the vehicle position as determined by the position fixing system is given by:

$x_{reset} = x'' - x'_o$ $y_{reset} = y'' - y'_o$ $z_{reset} = z'' - z'_o$ wherein:
 $x_{reset}$=the adjustment to be added to the $x'$ output of the vehicle navigation system;
 $Y_{reset}$=the adjustment to be added to the $y'$ output of the vehicle navigation system;
 $z_{reset}$=the adjustment to be added to the $z'$ output of the vehicle navigation system;
 $x'_o$=the vehicle's position along the $x'$ axis as determined by the vehicle navigation system;
 $y'_o$=the vehicle's position along the $y'$ axis as determined by the vehicle navigation system; and
 $z'_o$=the vehicle's position along the $z'$ axis as determined by the vehicle navigation system.

20. The system of claim 15 wherein the search coils contain a core with a high magnetic permeability.

21. The system of claim 14 wherein each alternating current electromagnet has an operating frequency, and each operating frequency is different from any other operating frequency.

22. The system of claim 21 wherein the magnetic sensors are able to distinguish between different marker operating frequencies.

* * * * *